US012767584B2

(12) United States Patent
Matano et al.

(10) Patent No.: US 12,767,584 B2
(45) Date of Patent: Oct. 20, 2026

(54) CRYSTALLIZED GLASS

(71) Applicant: Nippon Electric Glass Co., Ltd., Shiga (JP)

(72) Inventors: Takahiro Matano, Shiga (JP); Yuki Yokota, Shiga (JP); Atsushi Tanaka, Shiga (JP); Yoshihisa Takayama, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 865 days.

(21) Appl. No.: 17/919,621

(22) PCT Filed: Apr. 13, 2021

(86) PCT No.: PCT/JP2021/015339
§ 371 (c)(1),
(2) Date: Oct. 18, 2022

(87) PCT Pub. No.: WO2021/215307
PCT Pub. Date: Oct. 28, 2021

(65) Prior Publication Data

US 2023/0357070 A1 Nov. 9, 2023

(30) Foreign Application Priority Data

Apr. 23, 2020 (JP) ................................ 2020-076603

(51) Int. Cl.
*C03C 3/087* (2006.01)
*C03C 3/089* (2006.01)
*C03C 4/00* (2006.01)
*C03C 10/00* (2006.01)

(52) U.S. Cl.
CPC .............. *C03C 3/087* (2013.01); *C03C 3/089* (2013.01); *C03C 4/0028* (2013.01); *C03C 10/0036* (2013.01)

(58) Field of Classification Search
CPC . C03C 4/0028; C03C 4/0092; C03C 10/0036; C03C 10/0018; C03C 3/089; C03C 3/091; C03C 21/002; C03C 21/00
See application file for complete search history.

(56) References Cited

U.S. PATENT DOCUMENTS

| | | | |
|---|---|---|---|
| 2006/0063009 A1 | 3/2006 | Naitou et al. | |
| 2012/0135848 A1 | 5/2012 | Beall et al. | |
| 2014/0134397 A1 * | 5/2014 | Amin ................. | C03C 10/0045 428/141 |
| 2014/0141285 A1 | 5/2014 | Momono et al. | |
| 2016/0280589 A1 | 9/2016 | Beall et al. | |
| 2019/0161397 A1 | 5/2019 | Beall et al. | |

FOREIGN PATENT DOCUMENTS

| | | |
|---|---|---|
| JP | 09-263424 | 10/1997 |
| JP | 2003-128435 | 5/2003 |
| JP | 2006-062929 | 3/2006 |
| JP | 2006-083045 | 3/2006 |
| JP | 2013-544229 | 12/2013 |
| JP | 2014-114200 | 6/2014 |
| JP | 2018-513091 | 5/2018 |
| WO | 2019/108876 | 6/2019 |

OTHER PUBLICATIONS

International Search Report issued Jul. 13, 2021, in International (PCT) Application No. PCT/JP2021/015339, with English.
The Second Office Action issued Jun. 11, 2024 in corresponding Chinese Patent Application No. 202180028601.1, with English language translation.
Handbook of Glass Properties and Processes, Thrones, p. 87, Chemical Industry Press, Jun. 2013 (p. 3.).
International Preliminary Report on Patentability and Written Opinion of the International Searching Authority issued Oct. 25, 2022, in International (PCT) Application No. PCT/JP2021/015339.

* cited by examiner

*Primary Examiner* — Laura A Auer
(74) *Attorney, Agent, or Firm* — Wenderoth, Lind & Ponack, L.L.P.

(57) ABSTRACT

Provided is a crystallized glass, which has a high fracture toughness value, and besides, is excellent in transparency. The crystallized glass includes, in terms of mass %, 40% to 70% of $SiO_2$, 5% to 40% of $Al_2O_3$, 2% to 25% of $B_2O_3$, 0% to 15% of MgO+ZnO, 0% to 20% of CaO+SrO+BaO, 0% to 8% of $P_2O_5$+$TiO_2$+$ZrO_2$, 1% to 20% of $Na_2O$+$K_2O$, and 0% to 6% of $Li_2O$, has a crystallinity of from 1% to 50%, and has an average visible-light transmittance of 50% or more at a thickness of 0.8 mm and a wavelength of from 380 nm to 780 nm.

8 Claims, No Drawings

CRYSTALLIZED GLASS

TECHNICAL FIELD

The present invention relates to a crystallized glass.

BACKGROUND ART

A cellular phone, a digital camera, a personal digital assistant (PDA), or the like shows a tendency of further prevalence. In those applications, a cover glass is used for protecting a touch panel display (see Patent Literature 1).

CITATION LIST

Patent Literature

Patent Literature 1: JP 2006-083045 A

SUMMARY OF INVENTION

Technical Problem

The cover glass, particularly a cover glass for a smartphone is often used outdoors, and hence a surface scratch is highly recognizable by light with high illuminance and high parallelism, which results in a reduction in visibility of a display. Accordingly, it is important to improve the scratch resistance of the glass. A conceivable useful method of improving the scratch resistance is to increase a fracture toughness value. When a fracture toughness value is increased, a surface scratch is less liable to occur. Besides, even when a hard scratch occurs, the width and depth of the scratch can be reduced.

As a glass having a high fracture toughness value, a crystallized glass having a crystal precipitated therein is known.

However, under current circumstances, the crystallized glass is inferior in transparency to an amorphous glass, and is not suitable as the cover glass.

An object of the present invention is to provide a crystallized glass, which has a high fracture toughness value, and besides, is excellent in transparency.

Solution to Problem

According to one embodiment of the present invention, there is provided a crystallized glass, comprising, in terms of mass %, 40% to 70% of $SiO_2$, 5% to 40% of $Al_2O_3$, 2% to 25% of $B_2O_3$, 0% to 15% of MgO+ZnO, 0% to 20% of CaO+SrO+BaO, 0% to 8% of $P_2O_5+TiO_2+ZrO_2$, 1% to 20% of $Na_2O+K_2O$, and 0% to 6% of $Li_2O$, having a crystallinity of from 1% to 50%, and having an average visible-light transmittance of 50% or more at a thickness of 0.8 mm and a wavelength of from 380 nm to 780 nm. Herein, the "MgO+ZnO" means the total content of MgO and ZnO, the "CaO+SrO+BaO" means the total content of CaO, SrO, and BaO, the "$P_2O_5+TiO_2+ZrO_2$" means the total content of $P_2O_5$, $TiO_2$, and $ZrO_2$, and the "$Na_2O+K_2O$" means the total content of $Na_2O$ and $K_2O$.

It is preferred that the crystallized glass according to the one embodiment of the present invention be substantially free of $As_2O_3$ and PbO.

It is preferred that the crystallized glass according to the one embodiment of the present invention have precipitated therein one or more kinds of crystals selected from gahnite ($ZnAl_2O_4$), forsterite ($Mg_2SiO_4$), anorthite ($CaAl_2Si_2O_8$), zirconolite ($CaZrTi_2O_7$), rutile ($TiO_2$), and zirconia ($ZrO_2$).

It is preferred that the crystallized glass according to the one embodiment of the present invention have an average crystallite size of 1 μm or less.

It is preferred that the crystallized glass according to the one embodiment of the present invention have formed in a surface thereof a compressive stress layer.

It is preferred that the crystallized glass according to the one embodiment of the present invention have a fracture toughness value of 0.75 $MPa \cdot m^{0.5}$ or more. Herein, the "fracture toughness value" refers to a value measured by an indentation fracture method (IF method) in conformity with JIS R1607, and is an average value over ten times of measurement.

It is preferred that the crystallized glass according to the one embodiment of the present invention have a refractive index (nd) of 1.6 or less and an Abbe number (νd) of 50 or more.

It is preferred that the crystallized glass according to the one embodiment of the present invention have a bending strength of 100 MPa or more and a drop height of 5 mm or more. Herein, the "drop height" refers to a maximum value for the height at which, when a glass sheet measuring 50 mm×50 mm is placed on a surface plate made of granite, and a weight of 53 g having a Vickers indenter attached to its tip is vertically dropped from a predetermined height onto the glass, the glass maintains its original shape without being broken.

According to one embodiment of the present invention, there is provided a crystallized glass, having precipitated therein one or more kinds of crystals selected from gahnite ($ZnAl_2O_4$), forsterite ($Mg_2SiO_4$), anorthite ($CaAl_2Si_2O_8$), zirconolite ($CaZrTi_2O_7$), rutile ($TiO_2$), and zirconia ($ZrO_2$), having a crystallinity of from 1% to 50%, and having an average visible-light transmittance of 50% or more at a thickness of 0.8 mm and a wavelength of from 380 nm to 780 nm.

Advantageous Effects of Invention

According to the present invention, the crystallized glass, which has a high fracture toughness value, and besides, is excellent in transparency, can be provided.

DESCRIPTION OF EMBODIMENTS

A crystallized glass of the present invention comprises, in terms of mass %, 40% to 70% of $SiO_2$, 5% to 40% of $Al_2O_3$, 2% to 25% of $B_2O_3$, 0% to 15% of MgO+ZnO, 0% to 20% of CaO+SrO+BaO, 0% to 8% of $P_2O_5+TiO_2+ZrO_2$, 1% to 20% of $Na_2O+K_2O$, and 0% to 6% of $Li_2O$, has a crystallinity of from 1% to 50%, and has an average visible-light transmittance of 50% or more at a thickness of 0.8 mm and a wavelength of from 400 nm to 780 nm. In the following description, the expression "%" means "mass %" unless otherwise specified.

First, the reasons why the composition of the crystallized glass is limited as described above are described.

$SiO_2$ is a component that forms a glass skeleton. The content of $SiO_2$ is from 40% to 70%, and is particularly preferably from 45% to 55%. When the content of $SiO_2$ is too small, there is a tendency that weather resistance is remarkably reduced. Meanwhile, when the content of $SiO_2$ is too large, the meltability of the glass is liable to be reduced.

$Al_2O_3$ is a component that improves ion exchange performance. In addition, $Al_2O_3$ is also a constituent component of gahnite ($ZnAl_2O_4$) or anorthite ($CaAl_2Si_2O_8$). The content of $Al_2O_3$ is from 5% to 40%, and is preferably from 6% to 37%, from 7% to 35%, from 8% to 30%, or from 9% to 28%, particularly preferably from 10% to 25%. When the content of $Al_2O_3$ is too small, a coarse crystal is liable to be precipitated. In addition, it becomes difficult to crystallize the glass. Meanwhile, when the content of $Al_2O_3$ is too large, the meltability of the glass is liable to be reduced.

$B_2O_3$ has effects of improving the meltability of the glass and reducing a liquidus temperature. The content of $B_2O_3$ is from 2% to 25%, and is preferably from 4% to 22% or from 6% to 20%, particularly preferably from 8% to 18%. When the content of $B_2O_3$ is too small, not only the meltability of the glass becomes poor, but also the liquidus temperature is increased, with the result that devitrification is liable to occur at the time of forming of raw material glass. Meanwhile, when the content of $B_2O_3$ is too large, it becomes difficult to crystallize the glass. In addition, a coarse crystal is liable to be precipitated.

MgO and ZnO are each a component that improves the meltability of the glass. The content of MgO+ZnO is from 0% to 15%, and is preferably from 0.1% to 13%, from 1% to 12%, or from 2% to 10%, particularly preferably from 2.5% to 8%. When the content of MgO+ZnO is too small, the meltability of the glass is liable to be reduced. Meanwhile, when the content of MgO+ZnO is too large, the liquidus temperature is liable to be increased. In addition, there is a tendency that a crystallinity is excessively increased.

MgO is also a constituent component of forsterite ($Mg_2SiO_4$). The content of MgO is preferably from 0% to 20%, from 1% to 15%, or from 2% to 10%, particularly preferably from 2.5% to 8%. When the content of MgO is too large, the liquidus temperature is liable to be increased. In addition, there is a tendency that the crystallinity is excessively increased.

ZnO is also a constituent component of gahnite ($ZnAl_2O_4$). The content of ZnO is preferably from 0% to 20%, from 0.1% to 20%, from 0.2% to 18%, from 0.3% to 16%, from 0.4% to 14%, or from 0.5% to 12%, particularly preferably from 0.6% to 10%. When the content of ZnO is too large, the liquidus temperature is liable to be increased. In addition, there is a tendency that the crystallinity is excessively increased.

CaO, SrO, and BaO are each a component that improves the meltability of the glass. The content of CaO+SrO+BaO is from 0% to 20%, and is preferably from 0.1% to 18%, from 0.2% to 16%, from 0.3% to 14%, or from 0.4% to 12%, particularly preferably from 0.5% to 10%. When the content of CaO+SrO+BaO is too large, it becomes difficult to crystallize the glass. In addition, a coarse crystal is liable to be precipitated. CaO is also a constituent component of anorthite ($CaAl_2Si_2O_8$) or zirconolite ($CaZrTi_2O_7$), and the content thereof is preferably from 0% to 20%, from 0.1% to 18%, from 0.2% to 16%, from 0.3% to 14%, or from 0.4% to 12%, particularly preferably from 0.5% to 10%. The content of SrO is preferably from 0% to 20%, from 0.1% to 18%, from 0.2% to 16%, from 0.3% to 14%, or from 0.4% to 12%, particularly preferably from 0.5% to 10%. The content of BaO is preferably from 0% to 20%, from 0.1% to 18%, from 0.2% to 16%, from 0.3% to 14%, or from 0.4% to 12%, particularly preferably from 0.5% to 10%.

$P_2O_5$, $TiO_2$, and $ZrO_2$ are each a nucleating agent. The content of $P_2O_5$+$TiO_2$+$ZrO_2$ is from 0% to 8%, and is preferably from 0.1% to 8%, from 0.2% to 7%, from 0.3% to 6%, or from 0.4% to 5%, particularly preferably from 0.6% to 4.5%. When the content of $P_2O_5$+$TiO_2$+$ZrO_2$ is too small, it becomes difficult to crystallize the glass. Meanwhile, when the content of $P_2O_5$+$TiO_2$+$ZrO_2$ is too large, the meltability of the glass is liable to be reduced.

$P_2O_5$ is also a component that reduces a crystallite size. The content of $P_2O_5$ is preferably from 0% to 10%, from 0.1% to 9%, from 0.3% to 8%, from 0.5% to 6%, or from 0.5% to 5%, particularly preferably from 1% to 4%. When the content of $P_2O_5$ is too large, a devitrification property is increased, and melting and forming of the glass become difficult. In addition, chemical durability is liable to be reduced.

$TiO_2$ is also a constituent component of rutile ($TiO_2$). The content of $TiO_2$ is preferably from 0% to 10%, particularly preferably from 0.1% to 5%. When the content of $TiO_2$ is too large, a crystal growth rate is increased, and it is liable to become difficult to control the crystallinity. In addition, the devitrification property is increased, and melting and forming of the glass become difficult.

$ZrO_2$ is also a constituent component of zirconia ($ZrO_2$). The content of $ZrO_2$ is preferably from 0% to 8%, particularly preferably from 0.1% to 5%. When the content of $ZrO_2$ is too large, the devitrification property is increased, and melting and forming of the glass become difficult.

$Na_2O$ and $K_2O$ are each a component that improves the meltability of the glass, and are each also an essential component for ion exchange treatment. The content of $Na_2O$+$K_2O$ is from 1% to 20%, and is particularly preferably from 2% to 15%. When the content of $Na_2O$+$K_2O$ is too small, the meltability of the glass is liable to be poor, or the ion exchange performance is liable to be reduced. Meanwhile, when the content of $Na_2O$+$K_2O$ is too large, it becomes difficult to crystallize the glass. The content of $Na_2O$ is preferably from 1% to 20%, particularly preferably from 2% to 15%. The content of $K_2O$ is preferably from 1% to 20%, particularly preferably from 2% to 15%.

$Li_2O$ is a component that improves the meltability of the glass, and is also a component that may be involved in ion exchange treatment. The content of $Li_2O$ is from 0% to 4%, and is preferably from 0.1% to 3.5%, from 0.2% to 3%, from 0.3% to 2.5%, or from 0.4% to 2%, particularly preferably from 0.6% to 1.5%. When the content of $Li_2O$ is too large, the liquidus temperature is liable to be increased, and there is a tendency that the crystallite size is excessively increased.

A crystallized glass article of the present invention may comprise the following components in the glass composition, in addition to the above-mentioned components.

$SnO_2$ is a fining agent. The content of $SnO_2$ is preferably from 0% to 3%, from 0.05% to 2%, or from 0.1% to 1.5%, particularly preferably from 0.15% to 1.25%. When the content of $SnO_2$ is too large, the devitrification property is increased, and melting and forming of the glass become difficult. In addition, the crystal growth rate is increased, and there is a tendency that transparency is reduced.

$CeO_2$ is a component that not only has an effect of improving solubility, but also has an effect as an oxidizing agent to suppress an increase in amount of $Fe^{2+}$ in total Fe serving as an impurity, to thereby increase the transparency of the crystallized glass. The content of $CeO_2$ is preferably from 0% to 0.5% or from 0.05% to 0.5%, particularly preferably from 0.1% to 0.3%. When the content of $CeO_2$ is too large, there is a risk in that the crystallized glass may turn brown owing to excessively strong coloration caused by $Ce^{4+}$.

$SO_3$ may be introduced from Glauber's salt. $SO_3$ is a component that has an effect of increasing the solubility of the raw material glass. In addition, $SO_3$ acts as an oxidizing agent in the same manner as $CeO_2$, and this effect is exhibited remarkably through coexistence with $CeO_2$. The content of $SO_3$ is preferably from 0% to 0.5% or from 0.02% to 0.5%, particularly preferably from 0.05% to 0.3%. When the content of $SO_3$ is too large, there is a risk in that the surface quality of the crystallized glass may be degraded owing to precipitation of a heterogeneous crystal.

$As_2O_3$ and PbO are harmful, and hence the crystallized glass is preferably substantially free of $As_2O_3$ and PbO. Herein, the "substantially free of" means that those components are not intentionally added in the glass, and the case in which even inevitable impurities are completely excluded is not meant. In a more objective manner, the case in which the content of those components including impurities is 1,000 ppm or less is meant.

The crystallized glass of the present invention preferably has precipitated therein one or more kinds of crystals selected from gahnite ($ZnAl_2O_4$), forsterite ($Mg_2SiO_4$), anorthite ($CaAl_2Si_2O_8$), zirconolite ($CaZrTi_2O_7$), rutile ($TiO_2$), and zirconia ($ZrO_2$). When gahnite ($ZnAl_2O_4$), forsterite ($Mg_2SiO_4$), anorthite ($CaAl_2Si_2O_8$), zirconolite ($CaZrTi_2O_7$), rutile ($TiO_2$), and/or zirconia ($ZrO_2$) is precipitated, the fracture toughness value of the crystallized glass is increased. In addition, when gahnite ($ZnAl_2O_4$), rutile ($TiO_2$), and/or zirconia ($ZrO_2$) is precipitated, the chemically durability is improved. The present invention does not exclude the precipitation of any other crystal than gahnite ($ZnAl_2O_4$), forsterite ($Mg_2SiO_4$), anorthite ($CaAl_2Si_2O_8$), zirconolite ($CaZrTi_2O_7$), rutile ($TiO_2$), and zirconia ($ZrO_2$). In addition, gahnite ($ZnAl_2O_4$), forsterite ($Mg_2SiO_4$), anorthite ($CaAl_2Si_2O_8$), zirconolite ($CaZrTi_2O_7$), rutile ($TiO_2$), and zirconia ($ZrO_2$) are preferably main crystals, but are not necessarily main crystals.

The crystallized glass of the present invention has a crystallinity of from 1% to 50%, preferably from 2% to 40%, from 3% to 35%, or from 4% to 30%, particularly preferably from 5% to 20%. When the crystallinity is too low, there is a tendency that the fracture toughness value is reduced. Meanwhile, when the crystallinity is too high, a transmittance is liable to be reduced. In addition, when ion exchange is performed, the ratio of a glass phase to be subjected to ion exchange treatment is reduced, with the result that it becomes difficult to form a high compressive stress layer through the ion exchange treatment.

The crystallized glass of the present invention has a crystallite size of preferably 1 μm or less or 0.5 μm or less, particularly preferably 0.3 μm or less. When the crystallite size is too large, the transmittance is liable to be reduced. A lower limit of the crystallite size is not particularly limited, but is realistically 1 nm or more.

The crystallized glass of the present invention has an average visible-light transmittance at a thickness of 0.8 mm and a wavelength of from 380 nm to 780 nm of 50% or more, preferably 55% or more, particularly preferably 60% or more. When the transmittance is too low, it becomes difficult to use the crystallized glass as a cover glass for a smartphone.

The crystallized glass of the present invention has a whiteness L* value of preferably 50 or less or 40 or less, particularly preferably 30 or less. When the whiteness is too high, the transmittance is liable to be reduced. The whiteness L* value means a whiteness defined in JIS Z8730.

The crystallized glass of the present invention has a fracture toughness value of preferably 0.75 $MPa \cdot m^{0.5}$ or more, 1 $MPa \cdot m^{0.5}$ or more, or 1.1 $MPa \cdot m^{0.5}$ or more. When the fracture toughness value is too small, a glass surface is liable to suffer from a scratch. An upper limit of the fracture toughness value is not particularly limited, but is realistically 20 $MPa \cdot m^{0.5}$ or less.

The crystallized glass of the present invention has a refractive index (nd) of preferably 1.6 or less, 1.59 or less, 1.58 or less, 1.57 or less, or 1.56 or less, particularly preferably 1.55 or less. When the refractive index is too high, light scattering is liable to occur at an interface between the glass surface and air.

The crystallized glass of the present invention has an Abbe number (νd) of preferably 50 or more, 50.2 or more, 50.4 or more, 50.6 or more, or 50.8 or more, particularly preferably 51 or more. When the Abbe number is too small, in the case where the crystallized glass is used as a cover glass for a smartphone or the like, chromatic aberration is liable to occur in an image or a video to be displayed.

The crystallized glass of the present invention has a bending strength of preferably 100 MPa or more, 105 MPa or more, or 110 MPa or more, particularly preferably 120 MPa or more. When the bending strength is too low, the crystallized glass is liable to be broken. An upper limit of the bending strength is not particularly limited, but is realistically 2,000 MPa or less.

The crystallized glass of the present invention has a drop height of preferably 5 mm or more or 7 mm or more, particularly preferably 10 mm or more. When the drop height is too low, the crystallized glass is liable to be broken.

The crystallized glass of the present invention has a strain point of preferably 500° C. or more, particularly preferably 530° C. or more. When the strain point is too low, there is a risk in that the glass may be deformed in a crystallization step.

The crystallized glass of the present invention has a thermal expansion coefficient within the range of from 30° C. to 380° C. of preferably from $20\times10^{-7}$/K to $120\times10^{-7}$/K or from $30\times10^{-7}$/K to $110\times10^{-7}$/K, particularly preferably from $40\times10^{-7}$/K to $100\times10^{-7}$/K. When the thermal expansion coefficient is too low, it becomes difficult to match the thermal expansion coefficient with those of peripheral members. Meanwhile, when the thermal expansion coefficient is too high, thermal shock resistance is liable to be reduced.

Next, a method of producing the crystallized glass of the present invention is described.

First, glass raw materials are blended so as to give a desired composition. Next, the blended raw material batch is melted at 1,400° C. to 1,600° C. for 8 hours to 16 hours, and is formed into a predetermined shape to obtain a crystallizable glass body. Any well-known forming method, such as a float method, an overflow method, a down-draw method, a roll-out method, or a mold press method, may be adopted for the forming. The crystallizable glass body may be subjected to treatment such as bending processing as required.

Next, the crystallizable glass body is subjected to heat treatment at 700° C. to 1,100° C. for 0.1 hour to 10 hours to cause gahnite ($ZnAl_2O_4$), forsterite ($Mg_2SiO_4$), anorthite ($CaAl_2Si_2O_8$), zirconolite ($CaZrTi_2O_7$), rutile ($TiO_2$), and/or zirconia ($ZrO_2$) to be precipitated as a precipitation crystal. Thus, a transparent crystallized glass is obtained. Any other crystal than those six kinds may be precipitated. The heat treatment may be performed at only one specific temperature, may be performed stepwise by holding a temperature at two or more levels, or may be performed under a temperature gradient. In addition, crystallization may be promoted by applying a sound wave or an electromagnetic wave, or through irradiation.

After that, the crystallized glass may be subjected to ion exchange in order to further increase the fracture toughness value. In the ion exchange, the crystallized glass body is brought into contact with a molten salt controlled to a temperature around the strain point temperature of the crystallized glass, and thus an alkali ion (e.g., a Na ion or a Li ion) in a glass phase in the surface is substituted with an alkali ion (e.g., a K ion) having a larger ionic radius. Thus, a compressive stress layer having a compressive stress value of 300 MPa or more and a depth of layer of 10 μm or more can be formed in the surface of the crystallized glass. The "compressive stress value" and the "depth of layer" refer to values measured by laser micro-Raman spectroscopy.

The crystallized glass may be subjected to, for example, surface processing such as provision of a film, or mechanical processing, such as cutting or drilling, as required before or after the ion exchange.

EXAMPLES

Now, the present invention is described in detail by way of Examples. Examples 1 to 11 and Comparative Example 12 are shown in Table 1.

TABLE 1

| | Mass % | | | | | |
|---|---|---|---|---|---|---|
| | 1 | 2 | 3 | 4 | 5 | 6 |
| $SiO_2$ | 51 | 51 | 58 | 60.2 | 55.7 | 55.7 |
| $Al_2O_3$ | 19 | 20 | 11 | 13 | 20.6 | 20.9 |
| $B_2O_3$ | 9.5 | 9.5 | 7.3 | 9.7 | 5.2 | 5.2 |
| MgO | 1.5 | 1.5 | 7.5 | 0.6 | 1.0 | 0.4 |
| CaO | | | | | | |
| SrO | | | | | | |
| BaO | | | | | | |
| ZnO | 4 | 4 | 3.7 | 3.9 | 1.2 | 1.2 |
| $Li_2O$ | | | | 0.5 | | |
| $Na_2O$ | 8.4 | 8.3 | 8.2 | 8.4 | 12.4 | 12.6 |
| $K_2O$ | 2 | 2 | 1.3 | 1.7 | | |
| $TiO_2$ | 1.2 | 1.2 | 2.1 | 1 | 1.2 | 1.2 |
| $ZrO_2$ | 2 | 2 | 0.8 | 1 | 2.0 | 2.0 |
| $P_2O_5$ | 1.4 | 0.5 | | | 0.7 | 0.7 |
| $SnO_2$ | | | | | 0.1 | 0.1 |
| Crystallization temperature (° C.) | 810 | 810 | 810 | 810 | 850 | 850 |
| Crystallinity (%) | 10 | 10 | 25 | 15 | 10 | 10 |
| Average crystallite size (μm) | Not measured | Not measured | Not measured | Not measured | Not measured | Not measured |
| Precipitation crystal | $ZrO_2$ | $ZrO_2$ | $TiO_2$ $ZrO_2$ | $ZnAl_2O_4$ $ZrO_2$ | $ZrO_2$ | $ZrO_2$ |
| Density ($g/cm^3$) | 2.48 | 2.47 | Not measured | Not measured | Not measured | Not measured |
| Transmittance (%) | 91 | 92 | 70 | 85 | 90 | 91 |
| Fracture toughness value ($MPa \cdot m^{0.5}$) Before ion exchange | 1.1 | 1.2 | 1.2 | Not measured | 1.3 | Not measured |
| Fracture toughness value ($MPa \cdot m^{0.5}$) After ion exchange | 3 | 2.8 | 3.5 | Not measured | 4 | Not measured |
| Refractive index (nd) | 1.513 | 1.514 | 1.523 | Not measured | Not measured | 1.512 |
| Abbe number (vd) | 58 | 58 | 57.4 | Not measured | Not measured | 58 |
| Bending strength (MPa) Before ion exchange | 120 | 115 | Not measured | Not measured | Not measured | Not measured |
| Bending strength (MPa) After ion exchange | 700 | 720 | Not measured | Not measured | Not measured | Not measured |
| Drop height (mm) Before ion exchange | 10 | 10 | Not measured | Not measured | Not measured | Not measured |
| Drop height (mm) After ion exchange | 30 | 30 | Not measured | Not measured | Not measured | Not measured |
| Thermal expansion coefficient ($10^{-7}$/° C.) | 68 | Not measured | 72 | Not measured | Not measured | Not measured |

| | Mass % | | | | | |
|---|---|---|---|---|---|---|
| | 7 | 8 | 9 | 10 | 11 | 12 |
| $SiO_2$ | 47.4 | 47 | 49.0 | 49.7 | 60.0 | 61.5 |
| $Al_2O_3$ | 16.4 | 16.4 | 17.7 | 18.1 | 21.0 | 17.9 |
| $B_2O_3$ | 3.3 | 3.3 | 6.4 | 7.4 | 3.0 | 0.5 |
| MgO | 12.5 | 12.5 | 7.0 | 5.2 | 3.0 | 2.9 |
| CaO | | | | | | 0.1 |
| SrO | 2 | 2 | 1.0 | 0.7 | 0.7 | |
| BaO | | | | | 1.0 | |
| ZnO | 11.4 | 11.3 | 7.7 | 6.4 | | |
| $Li_2O$ | | | | 1.0 | 3.0 | |
| $Na_2O$ | 3 | 3 | 5.7 | 6.6 | 1.9 | 14.6 |
| $K_2O$ | 0.5 | 0.5 | 1.3 | 0.5 | 0.1 | 2 |

TABLE 1-continued

| | | | | | | | |
|---|---|---|---|---|---|---|---|
| $TiO_2$ | | 1.1 | 1.1 | 1.2 | 1.2 | 1.0 | |
| $ZrO_2$ | | 1.5 | 1.5 | 1.8 | 1.8 | 2.3 | |
| $P_2O_5$ | | 0.7 | 1.4 | 1.4 | 1.4 | 2.0 | |
| $SnO_2$ | | 0.2 | | | | 1 | 0.5 |
| Crystallization temperature (° C.) | | 850 | 850 | 850 | 850 | 830 | — |
| Crystallinity (%) | | 15 | 15 | 10 | 10 | 40 | |
| Average crystallite size (μm) | | Not measured | Not measured | Not measured | Not measured | Not measured | — |
| Precipitation crystal | | $Mg_2Si_2O_4$ $ZrO_2$ | $Mg_2Si_2O_4$ $ZrO_2$ | $ZnAl_2O_4$ $ZrO_2$ | $ZnAl_2O_4$ $ZrO_2$ | $TiO_2$ $ZrO_2$ | — — |
| Density (g/cm$^3$) | | Not measured | Not measured | Not measured | Not measured | Not measured | Not measured |
| Transmittance (%) | | 85 | 86 | 88 | 90 | 52 | 87 |
| Fracture toughness value (MPa · m$^{0.5}$) | Before ion exchange | Not measured | Not measured | Not measured | Not measured | Not measured | 0.7 |
| | After ion exchange | Not measured | Not measured | Not measured | Not measured | Not measured | — |
| Refractive index (nd) | | Not measured | 1.528 | Not measured | Not measured | Not measured | Not measured |
| Abbe number (νd) | | Not measured | 57 | Not measured | Not measured | Not measured | Not measured |
| Bending strength (MPa) | Before ion exchange | Not measured | Not measured | Not measured | Not measured | Not measured | 100 |
| | After ion exchange | Not measured | Not measured | Not measured | Not measured | Not measured | 650 |
| Drop height (mm) | Before ion exchange | Not measured | Not measured | Not measured | Not measured | Not measured | 5 |
| | After ion exchange | Not measured | Not measured | Not measured | Not measured | Not measured | |
| Thermal expansion coefficient ($10^{-7}$/° C.) | | Not measured | Not measured | Not measured | Not measured | Not measured | 71 |

Crystallized glasses of Examples 1 to 11 and Comparative Example 12 were each produced as described below.

First, batch raw materials having been blended so as to give the composition shown in Table 1 were loaded into a melting kiln and melted at 1, 500° C. to 1, 600° C. After that, the molten glass material was roll-formed, followed by being annealed. Thus, a crystallizable glass measuring 900 mm×1,200 mm×7 mm was produced. The crystallizable glass was subjected to heat treatment at the temperature shown in Table 1 for 2 hours. Thus, a crystallized glass was obtained. In Comparative Example 12, the heat treatment was not performed and the glass was not crystallized.

Next, the crystallized glass was subjected to ion exchange treatment by being immersed in a $KNO_3$ molten salt retained at 430° C. for 4 hours. Thus, a chemically tempered crystallized glass was obtained.

The sample thus produced was evaluated for a crystallinity, an average crystallite size, a precipitation crystal, a transmittance, a fracture toughness value, a refractive index, an Abbe number, a bending strength, a drop height, and a thermal expansion coefficient. The results are shown in Table 1.

The crystallinity, the average crystallite size, and the precipitation crystal were evaluated with an X-ray diffractometer (automatic multipurpose horizontal X-ray diffractometer SmartLab, manufactured by Rigaku Corporation). A scan mode, a scan type, a scatter and divergence slit width, a receiving slit width, a measurement range, a measurement step, and a scan rate were set to 2θ/θ measurement, continuous scan, 1°, 0.2°, from 10° to 60°, 0.1°, and 5°/min, respectively, and analysis software installed in the same model package was used to evaluate the precipitation crystal. In addition, the average crystallite size of the precipitation crystal was calculated through use of an X-ray diffraction peak measured based on a Debeye-Sherrer method. The scan rate was set to 1°/min in measurement for the calculation of the average crystallite size. In addition, the crystallinity was calculated based on an X-ray diffraction profile obtained by the above-mentioned method from the following expression: (integrated intensity of X-ray diffraction peak of crystal)/(total integrated intensity of X-ray diffraction measured)×100 [%].

The average visible-light transmittance at a wavelength of from 380 nm to 780 nm was measured with a spectrophotometer for a crystallized glass sheet having been optically polished on both surfaces so as to have a thickness of 0.8 mm. A spectrophotometer V-670 manufactured by JASCO Corporation was used for the measurement.

The fracture toughness value was measured ten times by an indentation fracture method (IF method) in conformity with JIS R1607, and an average value thereof was calculated.

The refractive index was represented as a value measured for a d-line (587.6 nm) of a helium lamp. KPR-2000 manufactured by Shimadzu Corporation was used for the measurement.

The Abbe number was calculated from the expression: Abbe number (νd)=(nd-1)/(nF-nC) through use of the above-mentioned refractive index of the d-line, and the values for the refractive indices of an F-line (486.1 nm) and a C-line (656.3 nm) of a hydrogen lamp. KPR-2000 manufactured by Shimadzu Corporation was used for the measurement.

The bending strength was measured by a three-point load method in conformity with ASTM C880-78.

The drop height was determined by a drop test. The drop test was performed by placing a glass sheet measuring 50 mm×50 mm on a surface plate made of granite, and vertically dropping a weight of 53 g having a Vickers indenter attached to its tip from a predetermined height onto the glass. A maximum value for the height at which the glass maintained its original shape without being broken was used as the drop height.

The thermal expansion coefficient was measured within the temperature range of from 30° C. to 380° C. for a crystallized glass sample having been processed into 20 mm×3.8 mmφ. A dilatometer manufactured by NETZSCH was used for the measurement.

The glasses of Examples 1 to 11 of the present invention were each a crystallized glass having a crystallinity of from 10% to 40%, and each had a transmittance as high as 52% or more and a fracture toughness value as high as 1.1 $MPa \cdot m^{0.5}$ or more. In addition, the fracture toughness value was further increased to 2.8 $MPa \cdot m^{0.5}$ or more through the ion exchange treatment. Meanwhile, the glass of Comparative Example 12 was an amorphous glass, and had a fracture toughness value as low as 0.7 $MPa \cdot m^{0.5}$.

INDUSTRIAL APPLICABILITY

The crystallized glass of the present invention is suitable as a cover glass for a touch panel display of, for example, a cellular phone, a digital camera, or a personal digital assistant (PDA). In addition, other than those applications, the crystallized glass of the present invention is expected to be applied to an application in which a high fracture toughness value and transparency are required, for example, a window glass, a substrate for a magnetic disk, a substrate for a flat panel display, a cover glass for a solar cell, or a cover glass for a solid state image sensor.

The invention claimed is:

1. A crystallized glass, comprising, in terms of mass %, 40% to 70% of $SiO_2$, 5% to 40% of $Al_2O_3$, 3% to 25% of $B_2O_3$, 0% to 15% of MgO+ZnO, 0% to 20% of CaO+SrO+BaO, 0.1% to 8% of $P_2O_5$+$TiO_2$+$ZrO_2$, 1% to 20% of $Na_2O$+$K_2O$, 0.1% to 8% of $ZrO_2$, and 0% to 6% of $Li_2O$, having a crystallinity of from 1% to 50%, having an average visible-light transmittance of 50% or more at a thickness of 0.8 mm and a wavelength of from 380 nm to 780 nm, and having zirconia crystals precipitated as a main crystal phase.

2. The crystallized glass according to claim 1, wherein the crystallized glass is substantially free of $As_2O_3$ and PbO.

3. The crystallized glass according to claim 1, wherein the crystallized glass has precipitated therein one or more kinds of crystals selected from gahnite ($ZnAl_2O_4$), forsterite ($Mg_2SiO_4$), anorthite ($CaAl_2Si_2O_8$), zirconolite ($CaZrTi_2O_7$), and rutile ($TiO_2$), in addition to zirconia ($ZrO_2$).

4. The crystallized glass according to claim 1, wherein the crystallized glass has an average crystallite size of 1 μm or less.

5. The crystallized glass according to claim 1, wherein the crystallized glass has formed in a surface thereof a compressive stress layer.

6. The crystallized glass according to claim 1, wherein the crystallized glass has a fracture toughness value of 0.75 $MPa \cdot m^{0.5}$ or more.

7. The crystallized glass according to claim 1, wherein the crystallized glass has a refractive index (nd) of 1.6 or less and an Abbe number (vd) of 50 or more.

8. The crystallized glass according to claim 1, wherein the crystallized glass has a bending strength of 100 MPa or more and a drop height of 5 mm or more.

* * * * *